United States Patent
Gokceli et al.

(10) Patent No.: US 10,411,934 B2
(45) Date of Patent: Sep. 10, 2019

(54) SUPERPOSITION CODED ORTHOGONAL FREQUENCY DIVISION MULTIPLEXING (SC-OFDM) SYSTEM

(71) Applicant: ISTANBUL TEKNIK UNIVERSITESI, Istanbul (TR)

(72) Inventors: Selahattin Gokceli, Istanbul (TR); Gunes Zeynep Karabulut Kurt, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 0 days.

(21) Appl. No.: 16/157,119

(22) Filed: Oct. 11, 2018

(65) Prior Publication Data

US 2019/0109748 A1 Apr. 11, 2019

(30) Foreign Application Priority Data

Oct. 11, 2017 (TR) .................................. 2017/15416

(51) Int. Cl.
| | | |
|---|---|---|
| H04L 27/26 | (2006.01) | |
| H04B 7/0417 | (2017.01) | |
| H04L 25/03 | (2006.01) | |
| H04L 25/02 | (2006.01) | |
| H04L 27/34 | (2006.01) | |

(52) U.S. Cl.
CPC ....... *H04L 27/2618* (2013.01); *H04B 7/0417* (2013.01); *H04L 25/0204* (2013.01); *H04L 25/03197* (2013.01); *H04L 27/2628* (2013.01); *H04L 27/3488* (2013.01); *H04L 2025/03426* (2013.01)

(58) Field of Classification Search
CPC ............ H04L 27/2618; H04L 25/0204; H04L 25/03197; H04L 27/2628; H04L 27/3488; H04B 7/0417
See application file for complete search history.

(56) References Cited

U.S. PATENT DOCUMENTS

| | | | |
|---|---|---|---|
| 6,449,246 B1 * | 9/2002 | Barton | ..................... H04L 5/023 370/206 |
| 7,558,191 B2 * | 7/2009 | Monogioudis | ...... H04L 27/2627 370/208 |
| 7,894,818 B2 * | 2/2011 | Khan | ...................... H04L 5/023 370/329 |
| 2019/0132171 A1 * | 5/2019 | Limberg | ............... H04L 1/0041 |

OTHER PUBLICATIONS

Zhenhua Gong et al., Implementation of OFDM-based Superposition Coding on USRP using GNU Radio,University of Notre Dame,Sep. 2009.

* cited by examiner

*Primary Examiner* — Jaison Joseph
(74) *Attorney, Agent, or Firm* — Gokalp Bayramoglu (57) ABSTRACT

A superposition coded orthogonal frequency division multiplexing system which sets forth a comprehensive solution and deals with factors such as peak-to average power ratio (PAPR), error performance enhancement, data rate increase, synchronization or channel estimation and multi input and output (MIMO), using a joint system.

24 Claims, 2 Drawing Sheets

SUPERPOSITION CODED ORTHOGONAL FREQUENCY DIVISION MULTIPLEXING (SC-OFDM) SYSTEM

CROSS REFERENCE TO RELATED APPLICATIONS

This application is based upon and claims priority to Turkish Patent Application No. 2017/15416, filed on Oct. 11, 2017, the entire contents of which are incorporated herein by reference.

TECHNICAL FIELD

The invention is related to a superposition coded orthogonal frequency division multiplexing (SC-OFDM) system which sets forth a comprehensive solution and deals with factors such as peak-to-average power ratio (PAPR), error performance enhancement, data rate increase, synchronization or channel estimation and multi input and output (MIMO), using a joint system.

BACKGROUND

The orthogonal frequency division multiplexing (OFDM) technique provides crucial usage conveniences and benefits. OFDM has been preferred in several wireless communication technologies in the recent years. OFDM is a multi carrier waveform and it allows carriers to be practically brought together. It has been able to relatively meet high data rate and error performance expectations. However some characteristic problems of OFDM do not seem to be able to meet the new generation communication technique expectations.

Power consumption inefficiency due to especially peak-to-average power ratio problems and the disimprovement of data performances are important problems.

Moreover, the number of pilots that are used in order to protect data rates must also be limited.

Data rate losses can be observed in the multi input and output application and improvement of channel estimation of OFDM and additional improvement techniques are required due to its synchronization precision. Due to these reasons OFDM, brings about several problems together with it in real life. Even though OFDM supported with hierarchical modulation (HM) provides data rate increase, it still remains as a problematic technique due to its inefficiency relating to error performance loss and other problems.

In the OFDM technique that is enabled by HM, each subcarrier is formed to be modulated with HM. However due to its qualities and due to a critical problem it has only found use in a limited area. In this technique, only data rate increase is being targeted and an intermediate data rate between some known basic modulations is provided. The most important limiting factor is the interference effect that emerges due to low priority (LP) signals. Superposition coding (SC) function is present in the non orthogonal multiple access (NOMA) technique which can be provided as one of the last similar techniques. NOMA is a candidate technology that can be used in 5G and higher communication standards. This technique in which OFDM can also be used is not a waveform technique, but it is a multi access technique. Signals are formed according to the channel conditions of the receiver nodes and power distribution is adjusted accordingly. Together with this NOMA does not change the wave structure and therefore these are evaluated as different approaches and they can also be used together.

In the U.S. Pat. No. 7,558,191 numbered United States patent document of the known state of the art, methods of transmitting and receiving signals for wireless communication and especially wireless communication in OFDM networks are mentioned. The technique that has been given in the reference document resembles the hierarchical modulation technique. The high priority (HP) and LP symbols that are combined with SC are related to being sent to different users rather than the same user. In the document that has been given as reference it is aimed to reduce the interference effect between HP and LP symbols. Therefore, it does not comprise a waveform design such as a superposition coded orthogonal frequency division multiplexing system but it quite the equivalent of the HM technique.

In the article published in 2009 titled Implementation of OFDM-based Superposition Coding on USRP using GNU Radio, the physical layer application of an OFDM based superposition coding system in a software defined radio is described. This document is deemed to be similar to the NOMA technique. Moreover, as it is a technique that is prior to the NOMA technique, it can be counted as one of the studies that forms basis to NOMA studies. In the publication, multi-access technique has been targeted rather than a waveform and the signal to be received by multiple users is combined with the SC technique, similarly to the NOMA technique. Due to this reason, it is far from being in the same category with the superposition coded orthogonal frequency division multiplexing system.

As the loss of synchronization in communication systems leads to receiving a significant amount of erroneous signals, it also leads to reduction of user satisfaction, and decrease in spectral efficiency due to the need for re-transmission. Similarly, the ineffectivity of channel estimation also leads to these two results. The estimated error performance cannot be obtained in many cases due to some problems that have not been modelled in real time. This also causes expenses to increase and service quality to decrease. Moreover, especially under the light of new applications, the need for high data rates increases, however because of limited resources and channel conditions, the improvements of data rates are also limited.

The problem of PAPR is one of the most limiting factors that prevents communication quality improvement and due to this both power efficiency, error performance and communication quality are seriously degraded. In the MIMO systems that are of the most fundamental systems, PAPR problem and pilot contamination problems are also limiting factors and due to this, such systems cannot be realized.

The system subject to the invention not only provides solutions to these problems but it also has the potential to provide the energy efficiency in systems and cost advantages and management feasibility. Especially due to the significant solution mechanisms it has provided for MIMO systems, it has the potential to provide significant outcomes to development of high speed communication systems.

SUMMARY

The aim of this invention is to provide a superposition coded orthogonal frequency division multiplexing system which sets forth a comprehensive solution and which deals with aspects such as PAPR, error improvement, data rate increase, synchronization and channel estimation improvement and MIMO with a joint design approach.

Another aim of this invention, is to provide a superposition coded orthogonal frequency division multiplexing system which improves error performance in data communication systems, increases data rates, improves PAPR values, enables to submit a superpositioned channel estimation sequence or a synchronization sequence, and allows these two processes to be carried out more precisely at the receiver.

Yet another aim of this invention is to provide a superposition coded orthogonal frequency division multiplexing system which enables energy efficiency, cost advantages and management ease.

BRIEF DESCRIPTION OF THE DRAWINGS

The superposition coded orthogonal frequency division multiplexing system provided in order to reach the aims of this invention has been illustrated in the figures.

According to these figures.

The parts in the figures are numbered and the references of these numbers are listed below.

1. Feedback Channel I
2. Quality Service Unit I
3. Hardware Feedback Unit
4. Central Control Unit I
5. Switching Unit I
6. Improvement Sequence Generation Unit
7. Information bit Generation unit
8. Switching Unit I
9. Modulation Unit I
10. Bit Sequence Determination Unit I
11. Index selection unit
12. Modulation Unit II
13. Power Adjustment Unit I
14. Multiplication Unit
15. Bit Sequence Determination Unit II
16. Multiplexing Unit
17. Modulation Unit III
18. Power Adjustment Unit II
19. Power Adjustment Unit III
20. SC-OFDM Symbol Collection Unit
21. S/P Converter Unit I
22. Grouping Unit
23. Coefficient Determination Unit
24. Modulation Unit IV
25. Power Adjustment Unit
26. IDFT Unit
27. Multiplication Unit II
28. Adding Unit
29. P/S Converter Unit I
30. CP Addition Unit
31. DAC Unit
32. Antenna Unit
33. MIMO Activation Unit I
34. Feedback Channel II
35. Quality Service Unit II
36. Central Control Unit II
37. MIMO Activation Unit II
38. ADC Unit
39. Synchronization Unit
40. CP Subtraction Unit
41. S/P Converter Unit II
42. DFT Unit
43. P/S Converter Unit II
44. Separation Unit I
45. Separation Unit II
46. Channel Estimation Unit
47. Coefficient Decoding Unit
48. Division Unit
49. Switching Unit III
50. Channel Estimation/Data Separation Unit
51. Synchronization/Channel Estimation Sequence Decoding Unit Channel Estimation Unit II
53. Switching Unit IV
54. Index Arrangement Unit I
55. Decoding Unit
56. Index arrangement Unit II
57. Decoding Unit II
58. Secondary Switching Unit
59. Symbol Demodulation Unit
60. Receiver Antenna Activation Unit

DETAILED DESCRIPTION

Figure 1:
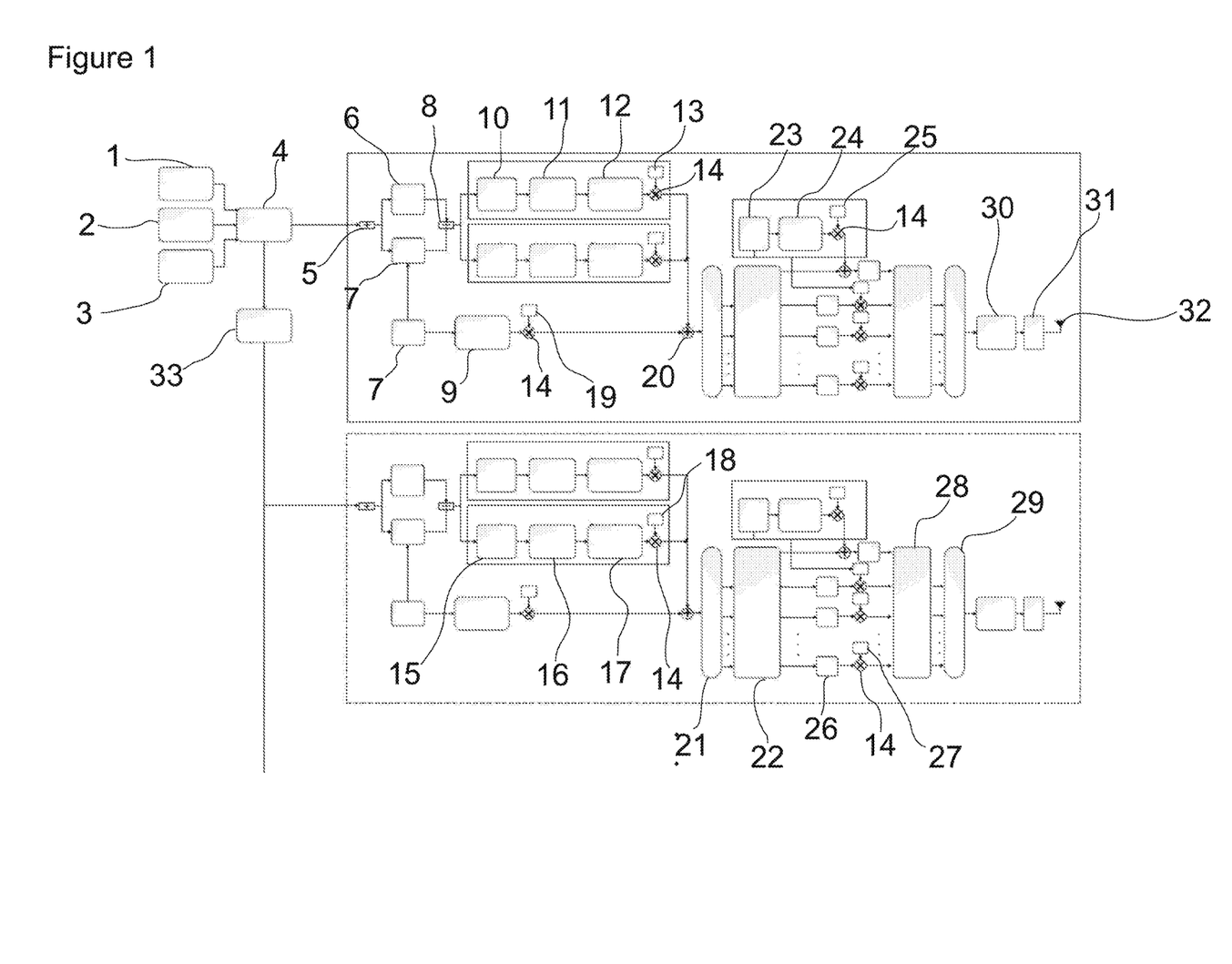
FIG. 1: Schematic view of the transmitter of the system subject to the invention.

The invention is a superposition coded orthogonal frequency division multiplexing system that comprises a transmitter which comprises, a feedback channel (I) (I) which gives feedback to the central control unit I (4) of the transmitter node or nodes related to channel status and suitable transmission parameters by collecting information obtained at the node or nodes with the communication channel, wherein the functions to be activated in the system are determined according to the information contained therein, quality service I (2) which provides suitable service quality parameters and submits the parameters to the central control unit I (4) as input, hardware feedback unit (3) which notifies the suitable PAPR level of the system to the central control unit I (4), a central control unit I (4), which is connected to the feedback channel I (1), quality service (2), hardware feedback unit (3) and MIMO activation unit I (33), and which evaluates the information provided by said units to decide with which parameters and how the system should be realized, synchronization/channel estimation switching unit I (5) connected to the synchronization/channel estimation improvement sequence generation unit (6) and information bit generation unit (7) switching unit, which is responsible of deciding whether a synchronization or channel estimation improvement sequence in a superposition coded orthogonal frequency division multiplexing system should be used according to the information transferred by the central control unit I (4).

synchronization/channel estimation improvement sequence generation unit (6) where the synchronization or channel estimation improvement sequence selected by the synchronization/channel estimation switching unit I (5) is generated, information bit generation unit (7) in connection with the switching unit I (5) where the information bits to be transmitted in the system are generated, a function selection switching unit II (8) which activates the related function according to the selection made between the error improvement and data rate increase functions, by using the information transferred by the central control unit I (4).

HP symbol modulation unit I (9) where HP symbols are generated and the information bits generated by the synchronization/channel estimation improvement sequence generation unit (6) or information bit generation unit (7) are modulated with the related modulation.

a bit sequence determination unit I (10) in connection with the index selection unit (11) by which the level of the modulation to be used in LP symbols for error improvement and the bits that will be submitted according to the multiplexing method shall be decided.

an index selection unit (11) connected with the LP symbol modulation unit, where the indexes suitable for the multiplexing approach are used in LP symbols for error improvement and applied to the sequence generated by the bit sequence determination unit I (10), LP symbol modulation unit II (12) connected to the index selection unit (I) (11) where the bits generated by the bit sequence determination unit I (10) for error improvement LP symbols are modulated with the related modulation, power adjustment unit I (13) where the power level of the error improvement LP symbols, generated by the modulation unit II (12) are adjusted, a multiplexing unit (1) (14) connected with the power adjustment unit I (13) which carries out multiplication of the symbols generated by the modulation unit II (12) with the related power coefficient.

a bit sequence determination unit II (15) connected with the function selection switching unit II (8) which decides the level of the modulation to be used in LP symbols for data rate increase and the decides which bits to be used according to the multiplexing method.

multiplexing unit (16) applied to the sequence generated by the bit sequence determination unit II (15), where the multiplexing of LP bits necessary for data rates to be increased, is carried out, an LP symbol modulation unit III (17) connected with the multiplexing unit where the bits generated by the bit sequence determination unit II (15) for the LP symbols generated during data rate increase is modulated with the related modulation and where LP symbols are generated.

power adjustment unit II (18) for data rate increase, where the power level of the LP symbols that have been generated by the data rate increase modulation unit III (17) are adjusted, a power adjustment unit III (19) which adjusts the power level of the HP symbols generated by the HP symbol modulation unit I (9), SC-OFDM symbol collection unit (20) connected to the IDFT unit (26) where the HP and LP symbols are added onto each other, S/P Converter unit I (21) in connection with the grouping unit (22) for PAPR improvement and SC-OFDM symbol collection unit I (20) that is applied from serial to parallel in order for the inverse discrete Fourier transform process can be applied for symbols that have been transferred by the SG-OFDM symbol collection unit (20)

grouping unit (22) for PAPR improvement where the symbols transferred by the S/P transform unit I (21) are separated into subcarrier groups in compliance with the PAPR improvement method, PAPR coefficient determination unit (23) where the phase coefficients giving the best PAPR improvement result are selected, a phase coefficient modulation unit IV (24) where the phase coefficients selected by the PAPR coefficient determination unit (23) are modulated by the related modulation and converted into LP symbols.

power adjustment unit IV (25) for PAPR improvement where the LP symbol powers generated from the related phase coefficients generated by the PAPR coefficient determination unit (23) are determined, IDFT Unit (26) where all the related subcarrier groups formed by the grouping unit (22) for PAPR improvement are passed to time from the frequency region with inverse discrete Fourier transform for an efficient multi carrier transmission and where the phase coefficient of these are transferred to the multiplication unit II (27), a phase coefficient multiplication unit II (27) where the phase coefficients selected by the PAPR coefficient determination unit (23) are multiplied by the symbols converted into time.

collection unit (28) for PAPR enhancement wherein the groups carrying the phase coefficients and group symbols that have been multiplied by the phase coefficients are collected, PIS converter unit I (29) in connection with the CP addition unit (30) which applies parallel to serial conversion in order to obtain the serial state prior to the inverse discrete Fourier transform relating to the symbols that have been transferred by the collection unit (28)

CP addition unit (30) in connection with the DAC unit (31) where a prefix addition process is applied to the symbol transferred by the P/S transform unit I (29) in order to provide protection against channel latency propagation, antenna unit (32) where the analogue symbol transferred from the DAC unit (31) is carried to the antenna and submitted.

a MIMO activation unit I (33) by which the activation of the MIMO mode is decided and the related antenna are activated accordingly.

Figure 2:
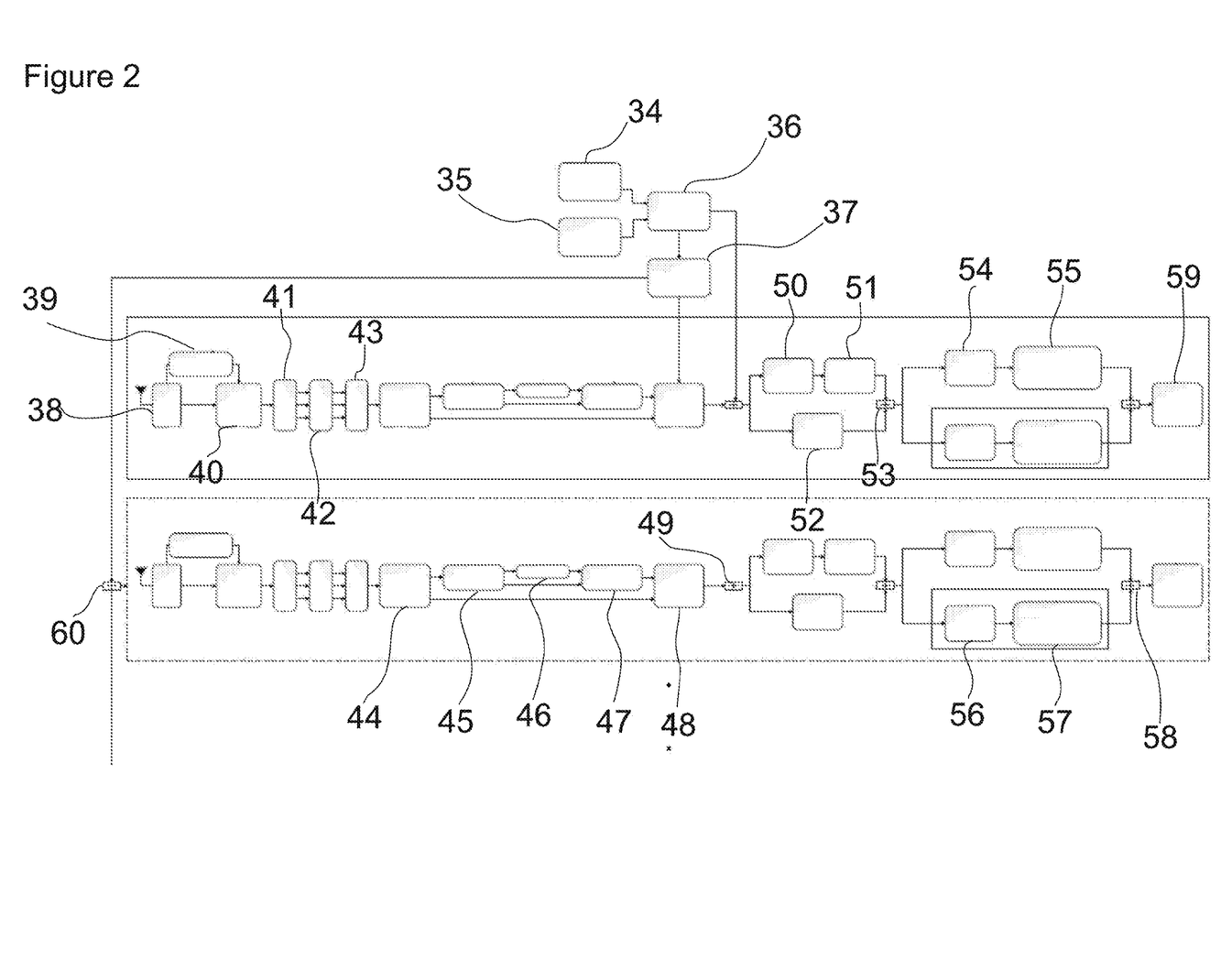
FIG. 2: Schematic view of the receiver of the system subject to the invention.

The invention is a superposition coded orthogonal frequency division multiplexing system comprising a receiver, which comprises, feedback channel II (34) which collects the information obtained at the receiver node or nodes via the communication channel and which provides feedback to the transmitter node or nodes regarding the suitable transmission parameters and the channel status, where the function of the receiver in the system that is to be activated is determined by means of the information collected in said feedback channel, quality service unit II (35) which provides suitable service quality and submits these parameters to the receiver as input, a central control unit II (36) which evaluates the information provided by the feedback channel II (34) and quality service unit II (35) and determines how and with which parameters the receiver structure shall by carried out in the superposition coded orthogonal frequency division multiplexing system, a MIMO activation unit II (37) which decides the activation of the MIMO mode and by which the related antenna are activation, ADC unit (38) where the analogous signal received by antenna is converted to a digital symbol by means of the analog-to-digital converter (ADC), synchronization unit (39) which provides synchronization by processing the data transferred by the ADC Unit (3) by correcting the deviation between the transmitter and receiver, CP subtraction Unit (40) in connection with the S/P transform Unit (II) (41) where the CP subtraction unit is applied to the data transferred from the ADC Unit (38) and synchronization unit (39).

S/P transform unit II (41) which applies parallel to serial conversion to symbols that have been transferred by the CP subtraction unit (40) in order for discrete Fourier transform (DFT) to be applied, DFT unit (42) in connection with the P/S transform Unit II (43) where subcarriers are converted to frequency domain from the time domain signal that are transferred by the S/P transform Unit (41) are obtained by DFT, P/S transform unit II (43) in connection with the pilot/data decomposition unit I (44) where parallel to serial transform is applied to the symbols that have been transferred by the DFT unit (42), pilot/data decomposition unit (I) (44) where the pilot symbols are separated from the data symbols if available, in the symbols that have been transferred from the P/S transform unit II (43), PAPR group decomposition unit II (45) which carries the phase coefficients in the PAPR improvement method applied at the receiver, and where the subcarrier group is separated from the symbols transferred by the pilot/data decomposition unit (44), estimation unit I (46) in connection with the PAPR group separation unit II (45) which applies channel estimation for phase coefficient decoding unit (47), phase coefficient decoding unit (47) where the phase coefficients are decoded using channel coefficients that have been transferred from the channel estimation unit I (46), division unit (48) with phase coefficients where the division is applied to the remaining groups with the phase coefficients transferred by the phase coefficient decoding unit (47) and where the multiplication applied to the PAPR improvement method is taken back, a switching unit III (49) which carries out the switching process to the symbols that have been transferred by the division unit (48) according to the information transferred by the central control unit II (36) and if used the improvement is carried out by using a synchronization or channel estimation improvement sequence or by only applying channel estimation.

synchronization/channel estimation sequence decoding unit where improvement is applied to the submitted synchronization or channel estimation improvement sequence and where the sequence is decoded with the channel coefficients that have been transferred by the channel estimation/data decomposition unit (50), synchronization/channel estimation sequence decoding unit (51) where the submitted synchronization or channel estimation improvement sequence is decoded by the channel coefficients transferred by the channel estimation/data division unit (50), channel estimation unit II (52) where channel estimation process is applied, a switching unit IV (53) where the switching process is carried out and the suitable receiver is activated by selecting one of the data rate increase or error improvement methods.

an index formation unit I (54) for error improvement where the reverse of the index formation procedure carried out at the receiver for error improvement is carried out on the symbols transferred by the error switching unit IV (53).

decoding unit I (55) for error improvement where improvement is carried out by applying the special data decoding structure that has been determined for error improvement to the symbols that have been transferred by the index formation unit I (54), an index formation unit II (56) for data rate increase where the reverse of the index formation process carried out at the receiver for data rate increase is carried out to the symbols that have been transferred by the switching unit IV (53) is carried out, decoding unit II (57) for data rate increase where increase is carried out by applying the special data decoding structure determined by the data rate increase to the symbols that have been transferred by the index formation unit II (56) for data rate increase, secondary switching unit (58) where the continuation of the switching process at the switching unit IV (53) is carried out and the decoded symbols are transferred, symbol demodulation unit (59) where information bits are obtained from the decoded symbols that have been transferred by the secondary switching unit (58), an antenna activation unit (60) where the related receiver antennas are activated according to MIMO activity.

The invention primarily contributes to the error performance improvement in data communication systems. In first glance, occurance of interference due to the presence of LP symbols and the decrease in error performance can be expected. However it is possible to obtain error performance enhancement similar to the MIMO system by transmitting the related symbols as LP at different indexes which resembles the multiplexing principle in MIMO. The important point here is that the reception characteristics of LP symbols are known and decoding is carried out by using these characteristics.

Secondly, data rate increase advantages can be obtained. It can be said that an additional transmission dimension becomes available, due to the LP symbol indices. Additional different symbols can be transmitted to HP by using these indices and the data rate can be increased. The important point here is, as LP symbols are more susceptible to errors, it is more suitable to send these after repetition.

Another advantage is that the PAPR value can be improved by the invention. Partial transmit sequence (PTS) and selective mapping (SLM) techniques are well known PAPR improvement techniques. Principally, the techniques have principles such as the subcarriers in the OFDM technique are divided into groups and are passed through an IDFT process and are multiplied by discrete phase coefficients and thereby an optimum PAPR level is tried to be obtained. These two techniques are flexible structures and they may provide the desired PAPR improvement with increased complexity. However the most important problem of these techniques is that the optimum phase coefficients found should be transmitted to the receiver in each transmission. The most generalized approach is to divide some groups to phase coefficient transmissions or to transmit them with a higher power such that the receiver can understand. The first one leads to the decrease in data rate and the second one leads to extra power consumption and error performance loss. By means of the design developed via the superposition coding quality of the invention, power consumption and error performance are maintained and PAPR enhancement is integrated to the technique automatically. This feature ensures the usage potential of the invention to be high in real life usage.

The fourth advantage is that it enables the transmission of an additional channel estimation sequence or synchronization sequence that has been obtained by superposition coding. By this feature, error performance can be maintained in real life and due to this reason the usage of the invention can be preferred.

And the final important advantage is that the invention may provide possible usage advantages to the MIMO systems. In MIMO systems PAPR problem is more difficult and the symbol processing methods provide quite complex solutions. The PAPR enhancement feature the invention provides, can be easily adapted to a multi antenna and due to this reason, it provides a practical solution to the problem which affects both the power consumption and error performance of MEMO systems. Moreover the pilot transmission or the benefits of increasing data rate of the invention can solve the pilot contamination problem in MIMO systems without data loss. Moreover as the antenna index information in the spatial modulation (SM) technique that has been researched comprehensively in the recent years is enabled to be transmitted repetitively, this provides error performance maintaining benefits in such types of MIMO systems. Due to such features the usage potential of the invention in communication applications is quite high.

The superposition coded orthogonal frequency division multiplexing system comprises a novel communication transmitter and receiver structure. The models of the transmitter and receiver structures are detailed below.

Transmitter Model

The qualifications of the system can be expressed with the mathematical model below. If high power and low power symbol sequences are taken into consideration, the frequency domain symbols added onto each other can be defined as follows, $$X_d[k] = \sqrt{\alpha_{\mathcal{H}}} X_{\mathcal{H}}[k] + \sqrt{\alpha_{\mathcal{L}}} X_{\mathcal{L}}[k],$$
$$k=0,1,\ldots,K-1,$$

here $\sqrt{\alpha_{\mathcal{H}}}$ and $\sqrt{\alpha_{\mathcal{L}}}$ respectively define the determined power levels of the high power and low power symbols and, K defines the number of the data subcarriers in the frequency region. Moreover $X_{\mathcal{H}}[k]$ and $X_{\mathcal{L}}[k]$ express the high power and low power subcarriers, respectively. $X_{\mathcal{H}}[k]$ is obtained as follows, $$X_{\mathcal{H}}[k] = \text{MO}\mathcal{D}_{\mathcal{H}}[b],$$

here $b=[b(0),b(1),\ldots b(\log_2(\mathcal{M}_{\mathcal{H}})-1)]$ expresses a bit sequence modulated into symbols; $\text{MO}\mathcal{D}_{\mathcal{H}}$, denotes the modulation process by using $\mathcal{M}_{\mathcal{H}}$-QAM. The symbol set points for $\mathcal{M}_{\mathcal{H}}$-QAM are selected from the following set $$\mathcal{M}_{\mathcal{H}} = \{S_{\mathcal{H}}(i): 1 \leq i \leq \mathcal{M}_{\mathcal{H}}\}.$$

A. Synchronization and Channel Estimation Improvement

The low power symbols for this function are generated as follows $$X_{\mathcal{L}}[k] = \begin{cases} C[k], & k \in K_C, \\ \mathcal{B}[k] & k \in K_\beta, \end{cases}$$

here C[k], expresses the $k^{th}$ subcarrier of the related synchronization or channel estimation sequence; $K_C$ expresses the set that comprises the related indexes for the C[k] sequence. Moreover, $\mathcal{B}[k]$, comprises the related phase coefficient that is to be used in the PAPR reduction process and it can be expressed as follows $$\mathcal{B}[k] = \beta_i, k \in K_{B_i},$$

here $\beta_i$, expresses the phase coefficient applied to the $i^{th}$ sub group; and $K_{B_i}$ represents the indices assigned for $\beta_i$; and $K_{\mathcal{B}} = [K_{\beta_{di\ i}} K_{\beta_2} \ldots K_{\beta_U}]$ represents the set that contains the subcarrier indexes that belong to the $\mathcal{B}[k]$ sequence. As shown, in order to guarantee the successful decoding of the phase coefficients in the receiver, each phase coefficient is transmitted several times with different indexes.

B. Error Performance and Data Rate Improvement i. Error Performance Improvement

As the low power symbols are formed from a certain part of the bit series that has been modulated to high power symbols with $\mathcal{M}_{\mathcal{H}}$-QAM, this bit sequence is expressed as follows $$b = p(b_A, b_B),$$

here $b_A = [b_A(0), b_A(1), \ldots b_A(\log_2(\mathcal{M}_{\mathcal{L}})-1)]$ expresses the bit sequence used in low power symbol generation and $b_B = [b_B(0), B_A(1), \ldots b_B(\log_2(\mathcal{M}_{\mathcal{H}-\mathcal{L}})-1)]$ expresses a bit sequence that is not used in this process. In addition to this $b_A$ and $b_B$ represent respectively the bit groups included in the A and B index sets of b. Moreover, p(.) expresses the permutation function and forms the b sequence by assigning the bit sequences $b_A$ and $b_B$ to the related indexes. Similar to $X_{\mathcal{H}}[k]$, $\dot{x}_{\mathcal{L}}[k]$ can be expressed as follows, $$\dot{x}_{\mathcal{L}}[k] = \text{MO}\mathcal{D}_{\mathcal{L}}[b_A],$$

here $\text{MO}\mathcal{D}_{\mathcal{L}}$, expresses the modulation operation with $\mathcal{M}_{\mathcal{L}}$-QAM. The symbol set points for $\mathcal{M}_{\mathcal{L}}$-QAM are selected from the below set $$\mathcal{M}_{\mathcal{L}} = \{S_{\mathcal{L}}(i): 1 \leq i \leq \mathcal{M}_{\mathcal{L}}\}.$$

The high power and low power symbols that express the same bits in order to generate a virtual MEMO effect and in order to benefit from the channel must be sent to different indexes. Therefore $\dot{x}_{\mathcal{L}} = [\dot{x}_{\mathcal{L}}[0], \dot{x}_{\mathcal{L}}[1], \ldots, \dot{x}_{\mathcal{L}}[K_\epsilon-1]]$ should be re-expressed as follows $$X_E = p_{E_2}(\dot{x}_{\mathcal{L}}),$$

here the expression $p_{E_2}(.)$ expresses the permutation function and the vector members of $\dot{x}_{\mathcal{L}}$ shall be arranged according to set $B_S$ and $X_E = [X_E[0], X_E[1], \ldots, X_E[K_\epsilon-1]]$ is obtained. In addition to this $K_\epsilon$, expresses the length of the $K_E$ set. It should be noted that high power and low power symbols can be selected from different M-QAM symbol sets. For example 16-QAM ve 4-QAM can be used respectively. As a result low power symbols can be obtained as below $$X_{\mathcal{L}}[k] = \begin{cases} X_E[ind(k)], & k \in K_E, \\ \mathcal{B}[k], & k \in K_\beta, \end{cases}$$

here in the ind(k), $K_E$ set k. is the function which enables to verify the index number of the index.

ii. Data Rate Improvement

In this function as the high power and the low power symbols, are formed of different bit sequences, there is no need for any kind of index arrangement function. In the low power symbol transmission, the main difference from the high power symbol transmit is that the symbols are assigned to several different indexes. The low power symbols do not have good error performance and this repeated transmit can be desired for good performance.

In this case, the low power symbols can be obtained as follows $$X_{\mathcal{L}}[k] = \begin{cases} X_T[k], & k \in K_T, \\ \mathcal{B}[k], & k \in K_\beta, \end{cases}$$

here $X_T[k]$ expresses the related symbol and it is defined as below $$X_T[k] = \acute{X}_T(i) \quad k \in K_{T_i},$$

here $\acute{X}_T(i)$, expresses the i. element of $\mathcal{M}_{\mathcal{L}}$-QAM symbols. Moreover $K_{T_i}$ defines the indexes for $\acute{X}_T(1)$ transmit and $K_T$ encompasses all of the $K_{T_i}$ index sets.

C. PAPR Reduction

In order to obtain improved PAPR performance the PTS algorithm has been added into the superposition coded orthogonal frequency division multiplexing system by taking advantage of the superposition coding in the superposition coded orthogonal frequency division multiplexing system. First of all the data subcarriers are separated into groups and the remaining subcarrier positions are zeroed and vertical sub groups are formed. This is expressed as below $$\acute{X}[k] = \sum_{i=1}^{U+1} X_i[k],$$

here $X_i[k]$, i. defines the sub group and can be expressed as below $$X_i[k] = \begin{cases} X_d[k] & k \in K_i, \\ 0, & \text{değilse}, \end{cases}$$

here $K_i$, i. expresses the index set that has been assigned to a sub group.

Moreover, the total sub group number is U+1 and the quantity U of the group, is given as an input to the PTS algorithm, however the remaining sub group is formed as the group which carries the phase coefficients. According to the principle of the PTS technique, each sub group is converted into the time zone and is multiplied with the related phase coefficient, which lowers the average PAPR level. The time domain symbols are obtained as follows $$\acute{x}(n) = \sum_{i=1}^{U+1} x_i(n),$$

here $x_i(n)$ is expressed as follows following the IDFT process $$x_i(n) = \frac{1}{\sqrt{K}} \sum_{k=0}^{K-1} X_i[k] e^{j2\pi kn/K}, \quad n = 0, 1, \ldots, N-1,$$

N denotes the time domain example number. The PAPR level of the symbol is given as below $$PAPR = 10\log_{10} \frac{\max|x_i(n)|^2}{E[|x_i(n)|^2]},$$

here $E[.]$ expresses the value operator that is expected. The classic OFDM symbol production procedure, is modified with the phase multiplication process and the symbol following the PTS process is expressed as follows $$x(n) = x_1(n) + \sum_{i=2}^{U+1} \beta_i x_i(n),$$

here the sub group $x_1(n)$, is formed of $\mathcal{B}$ and it carries the phase coefficients as low power symbols. Therefore $\beta_i$, is the i. component of the phase coefficient vector $\beta$ and it receives value from the $\{-1,1\}$ value set. The optimal phase coefficients that minimize the PAPR level of the x(n) symbol are found following the search process and are transmitted. The desired PAPR level is selected with the suitable U value and phase coefficient set selection. Both the data rate and the error performance can be maintained with the suggested effective phase coefficient transmit procedure by means of the superposition coded orthogonal frequency division multiplexing system. Moreover power consumption is maintained and this ensures that the PAPR performance of the superposition coded orthogonal frequency division multiplexing system to be more efficient and effective.

Receiver Model

Following CP addition symbol transmission is carried out. In the receiver, the received symbol is expressed as follows $$y(n) = h(n) * x(n) + w(n),$$

n=0,1, . . . , N+$N_{CP}$−1,
here * expresses the linear convolution operator; $N_{CP}$, expresses the number of CP examples; h(n) expresses channel impact response and w(n) expresses AWGN. Following CP subtraction the frequency domain expression is expressed as below following N-pointed FFT $$Y[k] = \frac{1}{\sqrt{N}} \sum_{n=0}^{N-1} y(n) e^{-j2\pi kn/N}, \quad k = 0, 1, \ldots, N-1.$$

Y[k] can also be defined as below $$Y[k] = H[k]X[k] + W[k],$$

n=0,1, . . . , N−1,
here X[k], H[k] and W[k] are expressed with the frequency domain of x(n), h(n) and w(n) respectively. Following channel estimation and equalization the sub group comprising the phase coefficients is decoded first. The ML detector can be used as below in order to decode the high power symbols $$X_{\mathcal{H}}[k] = \arg\min_{S_{\mathcal{H}}(i) \in \mathcal{M}_{\mathcal{H}}} |Y_{\mathcal{B}}[k] - H_{\mathcal{B}}[k]\alpha_{\mathcal{H}} S_{\mathcal{H}}(i)|^2, \quad k \in K_\beta,$$

here $Y_{\mathcal{B}}[k]$ ve $H_{\mathcal{B}}[k]$, $K_\beta$ expresses the symbol and channel coefficient received from the k. sub carrier in the index set. By means of these metrics the approximate phase coefficients are obtained as below with the ML detector $$\beta_i = \arg\min_{S_c(i) \in L-1,1} \sum_{k=K_{\beta_i}(1)}^{K_{\beta_i}(\mathcal{X}_{\beta_i})} |\tilde{Y}_{\mathcal{B}}[k] - H_{\mathcal{B}}[k]S_{\mathcal{L}}(i)|^2, k \in K_{\beta_i},$$

here $\tilde{Y}_{\mathcal{B}}[k] = Y_{\mathcal{B}}[k] - H_{\mathcal{B}}[k]\bar{x}_{\mathcal{H}_{\mathcal{B}}}[k]$ is expressed as below. Moreover $K_{\beta_i}(i)$, expresses the i. index of $K_{\beta_i}$. Following this, the phase coefficients are equalized by using these coefficients $$Y_d[k] = \frac{H_d[k]\sum_{i=1}^{U+1}\beta_i X_i[k] + W_d[k]}{\beta_i} = H_d[k]\acute{X}[k] + \acute{W}_d[k],$$

here $H_d[k]$ and $W_d[k]$, expresses the channel coefficient and noise component in the k. subcarrier in the remaining U sub group.

A. Synchronization and Channel Estimation Improvement

If the synchronization sequence is preferred inside the superposition coded orthogonal frequency division multiplexing system following the phase coefficient equalization process, the most precise carrier frequency offset (CFO) value which impairs the symbol with a correlation based algorithm can be found. The sequence added to the high power symbols must have this kind of feature and this shall reduce the sensitivity of the system against CFO. If the preferred sequence is a pilot sequence, an improved estimation performance is obtained as a natural result of the extra pilot number.

The detector procedure can be different according to the transmit preference.

If the channel does not change during the coherency time quickly, symbols and the channel can be estimated as follows by means of the pilot transmit in the initial transmit $$\{\overline{H}_d[k], \overline{X}_d[k]\} = \arg\min_{X_d(i) \in \mathcal{X}_d, H_d(i) \in S_d} |Y_d[k] - H_d(l)X_d(i)|^2,$$

here $k = 0, 1, \ldots K_E - 1$. During the first pilot transmit, the symbols that have been transmitted to other transmits can be estimated as below with correct channel estimation assumption.

$$\overline{X}_d^i[k] = \arg\min_{X_d(i) \in \mathcal{X}_d} |Y_d[k] - \overline{H}_d^{i-1}[k]X_d(i)|^2,$$

Following this channel estimation is applied as below $$\overline{H}_d^i[k] = \arg\min_{S_d(i) \in s_d} |Y_d[k] - H_d(l)\overline{X}_d^i[k]|^2.$$

This method provides good performance and improved spectral efficiency with exact information of the coherency time by means of suitable channel conditions.

B. Error Performance Improvement i. Joint Detector

In this case, SIC procedures have not been taken into consideration and a joint ML decoding structure has been applied to high power and low power symbols. Accordingly the symbols that have been successively transmitted are obtained as follows $$\overline{X}_d[k] = \arg\min_{X_{\mathcal{H}}(i) \in \mathcal{X}_{\mathcal{H}}, S_d(i) \in s_d} |Y_d[k] - H_d[k](\sqrt{\alpha_{\mathcal{H}}}S_{\mathcal{H}}(i) + \sqrt{\alpha_{\mathcal{L}}}S_{\mathcal{L}}(i))|^2,$$

$$k = 0, 1, \ldots K_E - 1,$$

following this, the related data bits are obtained.

ii. Detector Where the Low Power Symbols are Known

In this detector the transmitted low power symbols are precisely known at the receiver. When these symbols are known the transmitted data symbols are obtained as follows $$\hat{X}_M[k] = \arg\min_{S_{\mathcal{H}}(i) \in \mathcal{X}_{\mathcal{H}}} |Y_d[k] - H_d[k](\sqrt{\alpha_{\mathcal{H}}}S_{\mathcal{H}}(i) + \sqrt{\alpha_{\mathcal{L}}}\bar{x}_{\mathcal{L}}[k])|^2.$$

iii. Detector Where the High Power Symbols are Known

Similarly to the prior detector group of the transmitted symbols are known precisely at the receiver. In such a case high power symbols are known and the low power symbols are obtained as $$\bar{x}_{\mathcal{L}}[k] = \arg\min_{S_{\mathcal{L}}(i) \in \mathcal{X}_{\mathcal{L}}} |Y_d[k] - H_d[k](\sqrt{\alpha_{\mathcal{H}}}\bar{x}_{\mathcal{H}}[k] + \sqrt{\alpha_{\mathcal{L}}}S_{\mathcal{L}}(i))|^2,$$

following this, index arrangement procedure is applied and low power symbols are expressed as $$\hat{\overline{X}}_{\mathcal{L}}[k] = p_{BS}^{-1}(\overline{X}_{\mathcal{L}}[k]).$$

iv. The Proposed Detector Structure

As low power symbols are received with high bit errors, it is not efficient to use these symbols directly in the decoding structure. An efficient approach is to use good low power symbols that has been obtained in small numbers, to decode high power symbols. If it can be guaranteed that a limited number of low power symbols are received correctly, the errors observed in high power symbols can be improved. At the first stage such a usage may not seem efficient, however a small number of successfully received low power symbols may provide improved performance. Therefore this decision can be reached correctly by using some metrics such as SNR and EVM. The procedure can be summarized as follows $$\hat{x}_{\mathcal{M},A}[k] = \ldots$$

if not here $b_A$ is decoded with symbols that reflect the bit sequence. $b_B$, is obtained as follows for a bit sequence $$\hat{x}_{\mathcal{M},\mathcal{B}}[k] = \arg\min_{S_{\mathcal{B}}(i) \in \mathcal{X}_{\mathcal{B}}} |\hat{Y}_{\mathcal{M},\mathcal{B}}[k] - H_{d,B}[k]S_{\mathcal{B}}(i)|^2,$$

where $l \in \{A, B\}$ and this expresses the subcarriers that correspond to the related indexes in the A and B sets of $\hat{Y}_{\mathcal{M},l}[k]$ and $H_{d,l}[k]$, $Y_d[k]$ and $H_d[k]$ Follow this, these symbols are combines and inverse permutation is applied and $\tilde{X}_{\mathcal{M}}[k]$ is obtained as follows $$\tilde{X}_{\mathcal{M}} = p(\tilde{X}_{\mathcal{M},A}, \tilde{X}_{\mathcal{M},B}),$$

and the bits transmitted with the demodulation process is obtained as follows $$\tilde{b}=\text{DEMOD}(\tilde{X}_{\mathcal{H}}),$$

here DEMOD, expresses demodulation operation.

C. Data Rate Increase

Similar to the phase coefficient decoding procedure, an ML detector having a decoding structure where different indexes are evaluated together should be applied. Similarly, ML detector is applied as follows for high power symbols $$\overline{X}_d[k] = \arg_{\mathcal{H}}{}^{\text{min}}_{S_{\mathcal{H}}} |Y_d[k] - H_d[k]\alpha_{\mathcal{H}} S_{\mathcal{H}}(i)|^2, k \in K_T.$$

Following this, low power symbols can be obtained as below with the ML detector.

$$\overline{X}_T[k] = \arg_{\text{min}} \Sigma_{\mathcal{H}}^{\mathcal{H}} |Y_d[k] - H_d[k]\alpha_{\mathcal{H}} S_{\mathcal{H}}(i)|^2, k \in K_T.$$

What is claimed is:

1. A superposition coded orthogonal frequency division multiplexing system, the system comprising: a transmitter and a receiver;

wherein, the transmitter comprises a feedback channel I providing feedback to a central control unit I of at least one transmitter node related to a channel status and quitable transmission parameters by collecting information obtained at the at least one node with a communication channel, wherein functions to be activated in the system are determined according to information contained therein, a quality service I provides service quality parameters and submits the service quality parameters to the central control unit I as an input, a hardware feedback unit notifies a PAPR level of the system to the central control unit I, an information bit generation unit in connection with a switching unit I where the information bits to be transmitted in the system are generated, an S/P Converter unit I in connection with a grouping unit for PAPR improvement and an SC-OFDM symbol collection unit is applied from serial to parallel in order for applying an inverse discrete Fourier transform process for symbols transferred by the SC-OFDM symbol collection unit, an IDFT Unit where all related subcarrier groups formed by the grouping unit for PAPR improvement are passed to time from the frequency domain with inverse discrete Fourier transform for an efficient multi carrier transmission and where phase coefficients of the subcarrier groups are transferred to the multiplication unit II, a P/S converter Unit (I) in connection with a CP addition unit for applying a parallel to serial conversion in order to obtain a serial state prior to the inverse discrete Fourier transform relating to the symbols transferred by the collection unit, a CP addition unit in connection with a DAC unit where a prefix addition process is applied to the symbol transferred by the P/S transform unit I in order to provide protection against a channel latency propagation, an antenna unit where the analogue signal transferred from the DAC unit is carried to an antenna and submitted, the central control unit I is connected to the feedback channel (I), the quality service I, the hardware feedback unit and a MIMO activation unit; I the central control unit I evaluates the information provided by the feedback channel (I), the quality service I, the hardware feedback unit and the MIMO activation unit to decide with parameters and a way to realize the system, a HP symbol modulation unit I generates HP symbols and modulates the information bits generated by a synchronization/channel estimation improvement sequence generation unit or information bit generation unit with a related modulation, an LP symbol modulation Unit II connected to an index selection unit I where the bits generated by the bit sequence determination unit I for error improvement LP symbols are modulated with the related modulation, a power adjustment unit I for adjusting the power level of the error improvement LP symbols generated by the modulation unit II, a multiplexing unit applied to the sequence generated by the bit sequence determination unit II for carrying out the multiplexing of LP bits necessary for data rates to be increased, a power adjustment unit II for data rate increase for adjusting the power level of the LP symbols generated by the data rate increase modulation unit a power adjustment unit III for adjusting the power level of the HP symbols generated by the HP symbol modulation unit I, a grouping unit for PAPR improvement where the symbols transferred by the S/P transform unit I (21) are separated into subcarrier groups in compliance with the PAPR improvement method, a PAPR coefficient determination unit where the phase coefficients giving the best PAPR improvement result are selected, a power adjustment unit IV for PAPR improvement where the LP symbol powers generated from the related phase coefficients generated by the PAPR coefficient determination unit are determined;

and the receiver comprises a feedback channel II for collecting the information obtained at at least one receiver node via the communication channel and for providing feedback to the at least one transmitter node regarding transmission parameters and the channel status, wherein a function of the receiver in the system to be activated is determined by means of the information collected in the feedback channel, a quality service unit II provides a suitable service quality and submits service quality parameters to the receiver as an input, an ADC unit for converting an analogous signal received by the antenna to a digital sign by means of an analog-to-digital converter (ADC), a synchronization unit provides synchronization by processing the data transferred by the ADC Unit by correcting a deviation between the transmitter and receiver, a CP removal unit in connection with the S/P transform unit II, wherein the CP removal unit is applied to the data transferred from the ADC Unit and the synchronization unit an S/P transform unit II (41) for parallel to serial conversion of symbols transferred by the CP removal unit in order for discrete Fourier transform (DFT) to be applied, a DFT unit in connection with the P/S transform unit II where frequency domain subcarriers are created from the time domain signal transferred by the S/P transform unit with a DFT operation, a P/S transform unit II in connection with a pilot/data decomposition unit I where parallel to serial transform is applied to the symbols transferred by the DFT unit, wherein, in the pilot/data decomposition unit I, the pilot symbols are separated from the data symbols if available, in the symbols transferred from the P/S transform unit II (43), an estimation unit I in connection with a PAPR group separation unit II for applying channel estimation for a phase coefficient decoding unit, a synchronization/channel estimation sequence decoding unit for applying an improvement to a submitted synchronization or channel estimation improvement sequence and where the sequence is decoded with the channel coefficients transferred by a channel estimation/data decomposition unit, a channel estimation unit II (52) for applying channel estimation process, a symbol demodulation unit for obtaining information bits from the decoded symbols transferred by a secondary switching unit, a central control unit II for evaluating the information provided by the feedback channel II and the quality service unit II and determining parameters and a way to carry out the receiver structure in the superposition coded orthogonal frequency division multiplexing system, a PAPR group decomposition unit II which carries the phase coefficients in the PAPR improvement method applied at the receiver, and where the subcarrier group is separated from the symbols transferred by the pilot/data decomposition unit, a phase coefficient decoding unit where the phase coefficients are decoded using channel coefficients that have been transferred from the channel estimation unit I.

2. The superposition coded orthogonal frequency division multiplexing system according to claim 1, wherein, the transmitter further comprises a synchronization/channel estimation switching unit I connected to the synchronization/channel estimation improvement sequence generation unit and the information bit generation unit switching unit, for deciding whether a synchronization or channel estimation improvement sequence in a superposition coded orthogonal frequency division multiplexing system shall be used according to the information transferred by the central control unit I.

3. The superposition coded orthogonal frequency division multiplexing system according to claim 1, wherein, the synchronization/channel estimation improvement sequence generation unit generates the synchronization or channel estimation improvement sequence selected by the synchronization/channel estimation switching unit I.

4. The superposition coded orthogonal frequency division multiplexing system according to claim 3, wherein, the transmitter further comprises a function selection switching unit II (8) for activating a related function according to the selection made between the error improvement and data rate increase functions, by using the information transferred by the central control unit I.

5. The superposition coded orthogonal frequency division multiplexing system according to claim 4, wherein, the transmitter further comprises a bit sequence determination unit I in connection with the index selection unit I by which the level of the modulation to be used in LP symbols for error improvement and the bits that will be submitted according to the multiplexing method shall be decided.

6. The superposition coded orthogonal frequency division multiplexing system according to claim 5, wherein, in the transmitter comprises an index selection unit, indexes suitable for the multiplexing approach are used in LP symbols for error improvement and applied to the sequence generated by the bit sequence determination unit I.

7. The superposition coded orthogonal frequency division multiplexing system according to claim 6, wherein, the transmitter further comprises a multiplexing unit I connected with the power adjustment unit I which carries out multiplication of the symbols generated by the modulation unit II with the related power coefficient.

8. The superposition coded orthogonal frequency division multiplexing system according to claim 7, wherein, the transmitter further comprises a bit sequence determination unit II connected with the function selection switching unit II for deciding the level of the modulation to be used in LP symbols for data rate increase and bits to be used according to the multiplexing method.

9. The superposition coded orthogonal frequency division multiplexing system according to claim 8, wherein, the transmitter further comprises an LP symbol modulation unit II connected with the multiplexing unit where the bits generated by the bit sequence determination unit II for the LP symbols generated during data rate increase is modulated with the related modulation and where LP symbols are generated.

10. The superposition coded orthogonal frequency division multiplexing system according to claim 9, wherein, the transmitter further comprises a phase coefficient modulation unit IV where the phase coefficients selected by the PAPR coefficient determination unit are modulated by the related modulation and converted into LP symbols.

11. The superposition coded orthogonal frequency division multiplexing system according to claim 10, wherein, the transmitter further comprises a phase coefficient multiplication unit II where the phase coefficients selected by the PAPR coefficient determination unit are multiplied by the symbols converted into time.

12. The superposition coded orthogonal frequency division multiplexing system according to claim 11, wherein, the transmitter comprises a collection unit for PAPR enhancement, wherein the groups carrying the phase coefficients and group symbols that have been multiplied by the phase coefficients are collected.

13. The superposition coded orthogonal frequency division multiplexing system according to claim 12, wherein, the transmitter further comprises a MIMO activation unit I by which the activation of the MIMO mode is decided and the related antenna are activated accordingly.

14. The superposition coded orthogonal frequency division multiplexing system according to claim 13, wherein, the receiver further comprises a MIMO activation unit II for deciding the activation of the MIMO mode and activating the related antenna.

15. The superposition coded orthogonal frequency division multiplexing system according to claim 14, wherein, the receiver further comprises a division unit with phase coefficients where the division is applied to the remaining groups with the phase coefficients transferred by the phase coefficient decoding unit and where the multiplication applied to the PAPR improvement method is taken back.

16. The superposition coded orthogonal frequency division multiplexing system according to claim 15, wherein, the receiver further comprises a switching unit III for carrying out the switching process to the symbols transferred by the division unit according to the information transferred by the central control unit II (36) and if used the improvement is carried out by using a synchronization or channel estimation improvement sequence or by only applying channel estimation.

17. The superposition coded orthogonal frequency division multiplexing system according to claim 16, wherein, the receiver further comprises a division unit for applying channel estimation to the symbols transferred by the switching unit II in order to decode the submitted synchronization or channel estimation improvement sequence.

18. The superposition coded orthogonal frequency division multiplexing system according to claim 17, wherein, the receiver further comprises a switching unit (IV) for carrying out the switching process and activating the suitable by selecting one of the data rate increase or error improvement methods.

19. The superposition coded orthogonal frequency division multiplexing system according to claim 18, wherein, the receiver further comprises an index formation unit I for error improvement, where the reverse of the index formation procedure carried out at the receiver for error improvement is carried out on the symbols transferred by the error switching unit IV (53).

20. The superposition coded orthogonal frequency division multiplexing system according to claim 19, wherein, the receiver further comprises a decoding unit I for carrying out the improvement by applying the special data decoding structure determined for error improvement to the symbols transferred by the index formation unit I.

21. The superposition coded orthogonal frequency division multiplexing system according to claim 20, wherein, the receiver further comprises an index formation unit IT for carrying out a reverse of the index formation process carried out at the transmitter in order to increase data rate for the symbols transferred by the switching unit IV.

22. The superposition coded orthogonal frequency division multiplexing system according to claim 21, wherein, the receiver further comprises a decoding unit II for data rate increase, where increase is carried out by applying the special data decoding structure determined by the data rate increase to the symbols transferred by the index formation unit II for data rate increase.

23. The superposition coded orthogonal frequency division multiplexing system according to claim 22, wherein, the receiver further comprises a secondary switching unit for carrying out the continuation of the switching process at the switching unit IV and transferring the decoded symbols.

24. The superposition coded orthogonal frequency division multiplexing system according to claim 23, wherein, the receiver further comprises an antenna activation unit for activating the related receiver antennas according to MIMO activity.

* * * * *